United States Patent
Vas'ko et al.

(10) Patent No.: US 8,437,105 B2
(45) Date of Patent: May 7, 2013

(54) MAGNETIC SENSOR WITH COMPOSITE MAGNETIC SHIELD

(75) Inventors: Vladyslav Alexandrovich Vas'ko, Apple Valley, MN (US); Venkateswara Rao Inturi, Shakopee, MN (US); Michael C. Kautzky, Eagan, MN (US); Zhihong Lu, Tuscaloosa, AL (US); Mark T. Kief, Lakeville, MN (US); Yifan Zhang, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 492 days.

(21) Appl. No.: 12/499,157

(22) Filed: Jul. 8, 2009

(65) Prior Publication Data
US 2011/0007425 A1 Jan. 13, 2011

(51) Int. Cl.
*G11B 5/39* (2006.01)

(52) U.S. Cl.
USPC .......................................................... 360/319

(58) Field of Classification Search ................... 360/319
See application file for complete search history.

(56) References Cited

U.S. PATENT DOCUMENTS

| | | | |
|---|---|---|---|
| 4,447,839 A * | 5/1984 | Desserre et al. | 360/319 |
| 5,515,221 A | 5/1996 | Gill | |
| 5,621,592 A | 4/1997 | Gill | |
| 5,792,546 A | 8/1998 | Kanamine | |
| 5,838,521 A * | 11/1998 | Ravipati | 360/319 |
| 6,292,334 B1 * | 9/2001 | Koike et al. | 360/319 |
| 6,437,949 B1 | 8/2002 | Macken | |
| 6,456,467 B1 * | 9/2002 | Mao et al. | 360/319 |
| 6,496,335 B2 * | 12/2002 | Gill | 360/319 |
| 6,731,474 B2 * | 5/2004 | Terunuma et al. | 360/319 |
| 6,775,108 B2 * | 8/2004 | Kief et al. | 360/319 |
| 6,807,031 B2 * | 10/2004 | Macken et al. | 360/317 |
| 7,180,712 B1 * | 2/2007 | Li et al. | 360/319 |
| 7,236,333 B2 | 6/2007 | Macken | |
| 7,369,360 B2 | 5/2008 | Vas'ko | |
| 2007/0211391 A1 | 9/2007 | Hirata | |
| 2007/0242391 A1 | 10/2007 | Yamaguchi | |
| 2007/0285847 A1 | 12/2007 | Lin | |
| 2008/0151439 A1 * | 6/2008 | Pinarbasi | 360/324.2 |
| 2008/0158741 A1 | 7/2008 | Lin | |

FOREIGN PATENT DOCUMENTS

JP 9 128712 5/1997

OTHER PUBLICATIONS

U.S. Appl. No. 12/391,404, filed Feb. 24, 2009, Vas'ko.
PCT Search Report and Written Opinion dated Dec. 6, 2010.

* cited by examiner

*Primary Examiner* — Will J Klimowicz
(74) *Attorney, Agent, or Firm* — Mueting Raasch & Gebhardt

(57) ABSTRACT

A magneto-resistive reader includes a first magnetic shield element, a second magnetic shield element and a magneto-resistive sensor stack separating the first magnetic shield element from the second magnetic shield element. The first shield element includes two ferromagnetic anisotropic layers separated by a grain growth suppression layer.

12 Claims, 3 Drawing Sheets

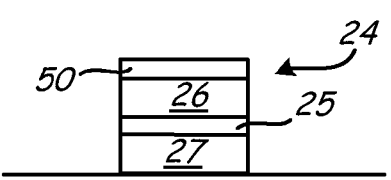
*FIG. 5A*
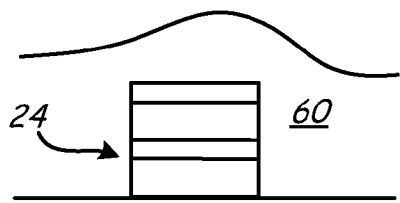
*FIG. 5B*
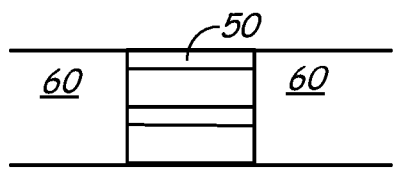
*FIG. 5C*
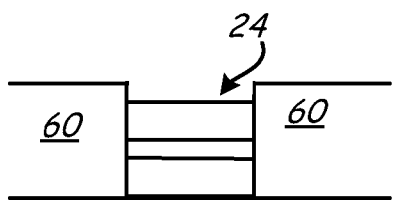
*FIG. 5D*
201 — Deposit CMP stop layer on smooth exposed bottom shield surface
202 — Deposit insulating material about the bottom shield
203 — CMP down to the CMP stop layer
204 — Remove CMP stop layer
*FIG. 6*

MAGNETIC SENSOR WITH COMPOSITE MAGNETIC SHIELD

BACKGROUND

In an electronic data storage and retrieval system, a magnetic recording head can include a reader portion having a sensor for retrieving magnetically encoded information stored on a magnetic medium. Magnetic flux from the surface of the medium causes rotation of the magnetization vector of a sensing layer or layers of the sensor, which in turn causes a change in the electrical properties of the sensor. The sensing layers are often called free layers, since the magnetization vectors of the sensing layers are free to rotate in response to external magnetic flux. The change in the electrical properties of the sensor may be detected by passing a current through the sensor and measuring a voltage across the sensor. Depending on the geometry of the device, the sense current may be passed in the plane (CIP) of the layers of the device or perpendicular to the plane (CPP) of the layers of the device. External circuitry then converts the voltage information into an appropriate format and manipulates that information as necessary to recover information encoded on the disc.

A structure in contemporary magnetic read heads is a thin film multilayer structure containing ferromagnetic material that exhibits some type of magnetoresistance. One magnetoresistive sensor configuration includes a multilayered structure formed of a nonmagnetic layer (such as a thin insulating barrier layer or a nonmagnetic metal) positioned between a synthetic antiferromagnet (SAF) and a ferromagnetic free layer, or between two ferromagnetic free layers. The resistance of the magnetic sensor depends on the relative orientations of the magnetization of the magnetic layers.

Magnetic read sensors have magnetic shields that to increase the spatial resolution of the read sensor by shielding the read sensor from stray magnetic fields. It is important that the magnetic domain configuration of the magnetic shield and its response to small magnetic fields from recording media be stable against exposure to large and nonuniform magnetic fields in order to minimize unwanted noise registered in the read sensor. The magnetic domain configuration can be established by controlling the magnetic anisotropy of the ferromagnetic shield material. However, processing of the read sensor can require that the shield be exposed to strong magnetic fields at elevated temperatures that can reorient (e.g., cause magnetic grain growth) the magnetic anisotropy of the magnetic shield in an unfavorable way.

BRIEF SUMMARY

The present disclosure relates to a magnetic sensor with a composite magnetic shield. The present disclosure can improve the areal density capabilities of various types of magneto resistive (MR) readers. The composite first magnetic shield provides stable anisotropy at elevated magnetic set and cross anneal temperatures.

In one particular embodiment, a magneto-resistive reader includes a first magnetic shield element, a second magnetic shield element and a tunneling magneto-resistive sensor stack separating the first magnetic shield element from the second magnetic shield element. The first shield element includes two ferromagnetic anisotropic layers separated by a grain growth suppression layer. The magneto-resistive reader can be a tunneling magneto-resistive reader with a TMR ratio of 100% or greater.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which:

FIG. 5A-5D are layer schematic diagrams illustrating the method of forming an illustrative shield element; and FIG. 6 is a flow diagram of an illustrative method of forming an illustrative shield element.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

It is noted that terms such as "top", "bottom", "above", "below", etc. may be used in this disclosure. These terms should not be construed as limiting the position or orientation of a structure, but should be used as providing spatial relationship between the structures. Other layers, such as seed or capping layers, are not depicted for clarity but could be included as technical need arises.

The present disclosure relates to a magnetic sensor with a composite magnetic shield. The composite magnetic shield provides stable anisotropy at elevated magnetic set anneal and cross temperatures. The composite magnetic shield includes two ferromagnetic layers separated by a grain growth suppression layer. The grain growth suppression layer inhibits structural changes in the ferromagnetic layers and stabilizes the anisotropic magnetic domain structure of the shield during a high temperature anneal. While the present disclosure is not so limited, an appreciation of various aspects of the disclosure will be gained through a discussion of the examples provided below.

Figure 1:
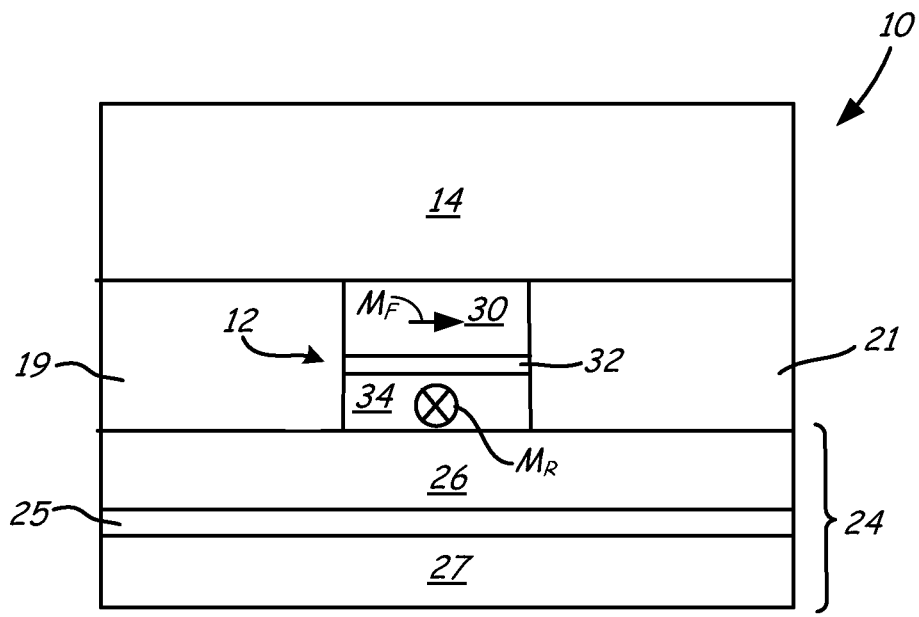
FIG. 1 is a front surface view of a reader including a free layer assembly having a perpendicular to the plane anisotropy and side shields.

FIG. 1 is a front surface view of a magneto-resistive (MR) reader 10 including a composite first shield 24 in some embodiments the magneto-resistive (MR) reader is a tunneling magneto-resistive (TMR) reader. The tunneling magneto-resistive (TMR) reader 10 includes a sensor stack 12 separating a second magnetic shield 14 from a first composite magnetic shield 24. The sensor stack 12 includes a reference magnetic element 34 having a reference magnetization orientation $M_R$ direction a free magnetic element 30 having a free magnetization orientation $M_F$ direction substantially perpendicular (and in-plane) to the reference magnetization orientation $M_R$ direction, and a non-magnetic spacer 32 layer separating the reference magnetic element 34 from the free magnetic element 30. While FIG. 1 illustrates a free magnetic element 30 having magnetization orientation $M_F$ direction substantially perpendicular to the reference magnetization orientation $M_R$ direction, it is understood that the free magnetization orientation $M_F$ direction can be substantially parallel or anti-parallel to the reference magnetization orientation $M_R$ direction. Electrically insulating layer 19, 21 electrically insulates the second magnetic shield 14 from a first composite magnetic shield 24.

In the embodiment shown, free magnetic element 30 is on the top of sensor stack 12 and reference magnetic element 34 is on the bottom of sensor stack 12. It will be appreciated that sensor stack 12 may alternatively include reference magnetic element 34 on the top of sensor stack 12 and free magnetic element 30 on the bottom of sensor stack 12.

Free magnetic element 30 is a single or a composite or multiple layer structure having a magnetization $M_F$ that rotates in response to an external magnetic field. In many embodiments, the sensor stack 12 senses magnetic flux from a magnetic media. In tunneling magneto-resistive (TMR) reader embodiments, the sensor stack 12 is a tunneling magneto resistive type (TMR) sensor where the reference magnetic element 34 and the free magnetic element 30 are ferromagnetic layers separated by an insulating spacer layer 32 that is thin enough (e.g., 1 to 5 nanometers thick) to allow electrons to tunnel from one ferromagnetic layer to the other ferromagnetic layer.

Spacer layer 32 is a nonmagnetic insulting layer disposed between free magnetic element 30 and reference magnetic element 34. In many embodiments, spacer layer 32 is a non-magnetic, insulative or semi-conductive material, such as oxides formed of Mg, Al, Hf, or Ti. In some embodiments the spacer layer 32 is MgO.

Reference magnetic element 34 has a fixed magnetization direction $M_R$ that is in-plane with the layer or layers of magnetic element 34. Magnetization direction $M_F$ of free magnetic element 30 is either perpendicular to fixed magnetization direction $M_R$ in a quiescent state or parallel or anti-parallel to fixed magnetization direction $M_R$ in a quiescent state. Reference magnetic element 34 may be a single ferromagnetic layer having an anisotropically defined magnetization direction. Reference magnetic element 34 may also include various combinations of layers to provide magnetization $M_R$ having a fixed direction, such as a ferromagnetic pinned layer with an antiferromagnetic pinning layer, a synthetic ferromagnetic pinned layer (i.e., two ferromagnetic layers coupled by a nonmagnetic metal, such as Ru), or a synthetic ferromagnetic pinned layer coupled to an antiferromagnetic pinning layer. Ferromagnetic layers of reference layer assembly 34 may be made of a ferromagnetic alloy, such as CoFe, NiFe, or NiFeCo, and the antiferromagnetic layer may be made of PtMn, IrMn, NiMn, or FeMn.

In operation, a sense current is passed through sensor stack 12 via shields 14 and 24 (which can also function as electronic leads in some embodiments) such that the sense current passes perpendicular to the plane of the layer or layers of sensor stack 12. As magnetization $M_F$ rotates in response to external magnetic fields, the resistance of sensor stack 12 changes as a function of the angle between magnetizations $M_F$ and $M_R$. The voltage across sensor stack 12 is measured between leads/shields 14 and 24 by external circuitry (not shown) to detect changes in resistance of sensor stack 12.

Portions of the sensor stack 12 require annealing to set a magnetization direction therein. Tunneling magneto resistive type sensor stack 12 design has shown that higher annealing temperatures such as, 300 degrees centigrade or greater, or 340 degrees centigrade or greater, or 390 degrees centigrade or greater, for example, improves the TMR ratio % of the sensor stack 12. The high temperature anneals can produce a tunneling magneto resistive type sensor stack 12 having a TMR ratio of 100% or greater, or 200% or greater, or 300% or greater. The TMR (tunneling magneto-resistive) ratio % is derived from the following equation (1):

$$\text{TMR ratio}(\%) = (R\max - R\min)/R\max \times 100 \tag{1}$$

Where Rmax and Rmin are the resistance values obtained when applying a current through the sensor stack in a parallel (low resistance state) and anti-parallel (high resistance state). Increasing the TMR ratio improves the sensor stack sensitivity and reliability.

Since the tunneling magneto resistive type sensor stack 12 is deposited on the composite first shield 24, the composite first shield 24 has to provide stable anisotropy at the higher anneal temperatures that are needed to provide the sensor stack 12 that possess a higher TMR ratio percentage. The composite first shield 24 described herein provides stable anisotropy at the higher anneal temperatures.

The composite first shield 24 includes two ferromagnetic anisotropic layers 26, 27 separated by a grain growth suppression layer 25. The grain growth suppression layer 25 inhibits diffusion, defect mobility, and grain crystallization during magnetic annealing of the magneto-resistive reader 10. The grain growth suppression layer 25 has a thickness of less than 100 Angstroms or 50 Angstroms or less, or a thickness in a range from 5 to 50 Angstroms. In many embodiments, the overall thickness of the composite first shield 24 is about one micrometer and in many embodiments the thickness of each of the two ferromagnetic anisotropic layers 26, 27 is about equal.

In some embodiments the grain growth suppression layer 25 is non-magnetic. In some embodiments the grain growth suppression layer 25 is magnetic. In illustrative embodiments, the grain growth suppression layer 25 is Ru, Ta, Nb, Zr, or Hf and the two ferromagnetic anisotropic layers 26, 27 are NiFe. In many embodiments, the grain growth suppression layer 25 is Ru or Ta and the two ferromagnetic anisotropic layers 26, 27 are NiFe.

Figure 2A:
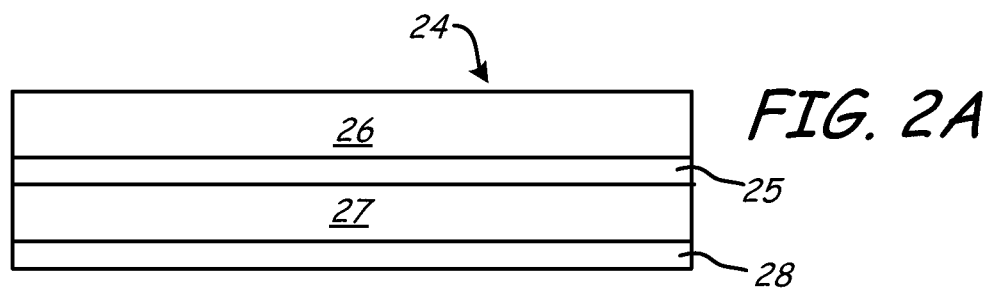
FIG. 2A is layer schematic diagram of an illustrative composite shield.

FIG. 2A is layer schematic diagram of an illustrative composite first shield 24. The composite first shield 24 includes two ferromagnetic anisotropic layers 26, 27 separated by a grain growth suppression layer 25, as described above. In some embodiments the grain growth suppression layer 25 is non-magnetic. In some embodiments the grain growth suppression layer 25 is magnetic. The composite first shield 24 can further include an optional hard magnetic layer 28. The hard magnetic layer 28 can be formed of any useful magnetic material that has an ability to magnetically couple to the bottom of the composite shield layers and have a magnetic coercivity high enough to withstand magnetization reversal from media and stray fields during operation.

Figure 2B:
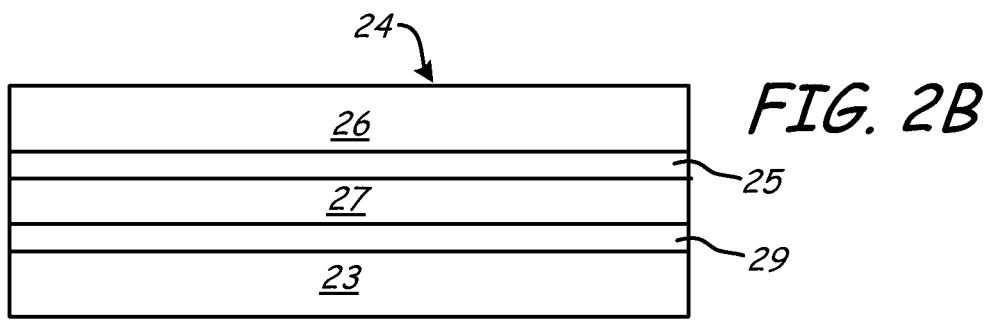
FIG. 2B is a layer schematic diagram of another illustrative composite shield.

FIG. 2B is a layer schematic diagram of another illustrative composite first shield 24. The composite first shield 24 includes three ferromagnetic anisotropic layers 26, 27, 23 separated by grain growth suppression layers 25, 29, as described above. In some embodiments the grain growth suppression layer 25, 29 is non-magnetic. In some embodiments the grain growth suppression layer 25, 29 is magnetic. The composite first shield 24 further can include a hard magnetic layer like in FIG. 2A. The hard magnetic layer 28 can be formed of any useful magnetic material.

Figure 3A:
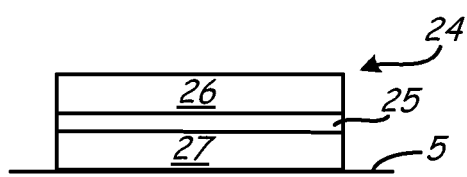
FIG. 3A-3C are layer schematic diagrams illustrating the method of forming an illustrative reader.
Figure 3B:
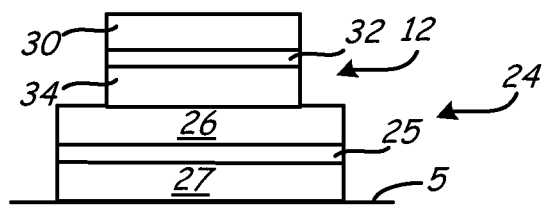
Figure 3C:
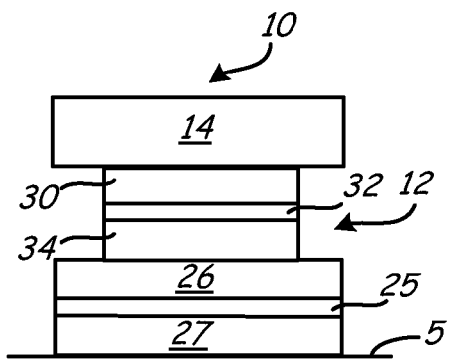
Figure 4:
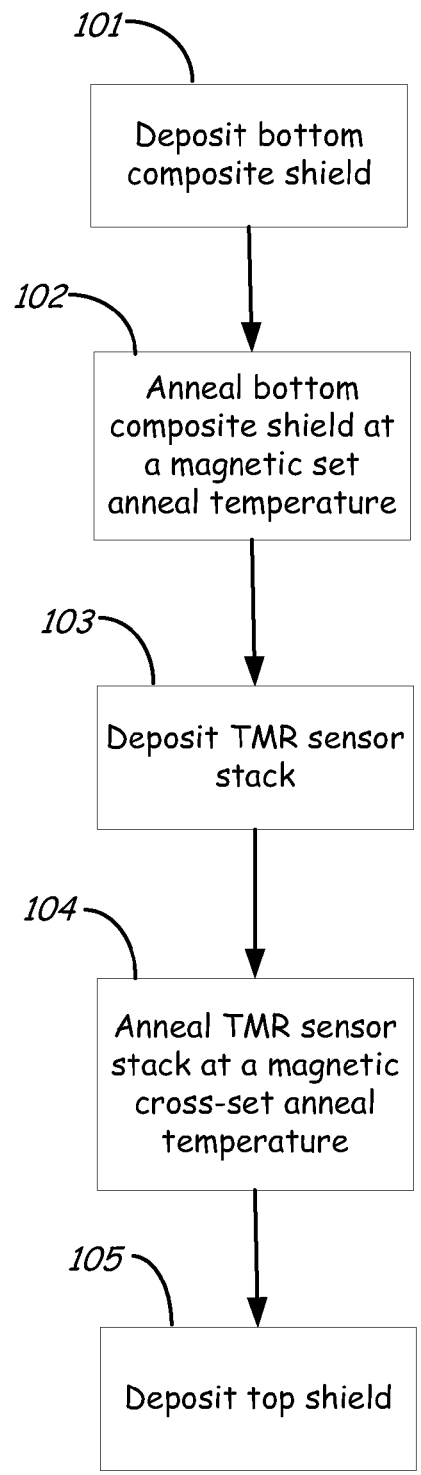
FIG. 4 is a flow diagram of an illustrative method of forming an illustrative reader.

FIG. 3A-3C are layer schematic diagrams illustrating the method of forming an illustrative tunneling magneto-resistive (TMR) reader 10. FIG. 4 is a flow diagram of an illustrative method of forming an illustrative tunneling magneto-resistive (TMR) reader. The method includes depositing a first shield element 24 on a substrate 5. The first shield element 24 can be sputter deposited using semiconductor fabrication techniques. The first shield element 24 includes two ferromagnetic anisotropic layers 27, 26 separated by a grain growth suppression layer 25 at block 101. The first shield element 24 is described above.

Then the method includes annealing the first shield element 24 at a magnetic set anneal temperature to form a set annealed first shield at block 102. A magnetic field is applied to the first shield element 24 at an elevated temperature to set the magnetic orientation of the at least one ferromagnetic layer 27, 26 of the first shield element 24. In many embodiments the magnetic set anneal temperature is greater than 350 degrees centigrade, or greater than 390 degrees centigrade, or greater than 440 degrees centigrade. As described above, the grain growth suppression layer 25 inhibits grain growth and improves the anisotropy of the first shield element 24.

Then the method includes depositing a tunneling magneto-resistive sensor stack 12 on the annealed first shield 24 at block 103 The tunneling magneto-resistive sensor stack 12 includes a reference magnetic element 34, a free magnetic element 30, and a non-magnetic spacer 32 layer separating the reference magnetic element 34 from the free magnetic element 30. The tunneling magneto-resistive sensor stack 12 is described above and can be sputter deposited using semiconductor fabrication techniques.

Then the tunneling magneto-resistive sensor stack 12 is annealed at a magnetic cross set anneal temperature to form a cross set annealed tunneling magneto-resistive sensor stack at block 104. A magnetic field is applied to the tunneling magneto-resistive sensor stack 12 at an elevated temperature to set the magnetic orientation of the at least one ferromagnetic layer 30, 34 of the tunneling magneto-resistive sensor stack 12. In many embodiments the cross set magnetic field is perpendicular to the magnetic set magnetic field. The magnetic cross set anneal temperature is below the set annealing temperature of the first shield element 24 so as not disturb the magnetic orientation of the first shield element 24 and above the blocking temperature of the antiferromagnet in the stack so the reference layer is pinned when it cools after annealing. In many embodiments, the magnetic cross set anneal temperature is greater than 350 degrees centigrade, or greater than 390 degrees centigrade. A second shield element 14 is then deposited on the cross set annealed tunneling magneto-resistive sensor stack 12 at block 105, to form the tunneling magneto-resistive (TMR) reader 10.

FIG. 5A-5D are layer schematic diagrams illustrating the method of forming an illustrative first shield element. FIG. 6 is a flow diagram of an illustrative method of forming an illustrative first shield element. The method includes depositing a first shield element 24. The first shield element 24 including two ferromagnetic anisotropic layers 27, 26 separated by a grain growth suppression layer 25, and annealing the first shield element 24 to form a set annealed first shield, as described above. An exposed surface of the first shield element 24 is then polished to form a smooth exposed first shield surface, utilizing semiconductor fabrication techniques. The polishing step removes a minor amount of layer being polished. For example, the polishing step removes less than 2% or less than 1% of the ferromagnetic layer being polished.

The structure of the first shield element 24 can be defined by any useful method, such as patterning by photolithography and then etching, for example. The patterning can be preformed following the deposing step of bock 201. The resulting structure is described as a patterned first shield element 24 below.

In many embodiments, a chemical mechanical polishing (CMP) stop layer 50 is then deposited on the smooth exposed first shield surface at block 201. The CMP stop layer 50 can be any useful CMP stop material such as chromium or a-carbon, for example. In many embodiments this structure is then patterned to form the desired first shield element dimensions, utilizing semiconductor fabrication techniques. In other embodiments, a chemical mechanical polishing (CMP) stop layer 50 is not deposited.

An insulating material 60 is deposited about the patterned first shield element 24 at block 202. The insulating material can be any useful electrically insulating material such as metal oxides or semiconductor oxides, for example. The insulating material 60 can encapsulate the patterned first shield element 24.

Then the method includes removing insulating material 60 by chemical mechanical polishing down to the chemical mechanical polishing stop layer 50 at block 203. The CMP method step forms a planar surface of insulating regions and CMP stop layer regions. Then the chemical mechanical polishing stop layer 50 is removed at bock 204. Then the sensor stack can be deposited on smooth exposed surface of the first shield element as described above.

This method provides layer thickness control of the top ferromagnetic layer of the composite first shield. Very little of the top ferromagnetic layer is removed during the CMP process and the smooth polish method step provides a smooth surface for depositing the sensor stack and improves the sensor stack uniformity during deposition.

Thus, embodiments of the MAGNETIC SENSOR WITH COMPOSITE MAGNETIC SHIELD are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

What is claimed is:

1. A magneto-resistive reader comprising:
a first magnetic shield element, the first shield element comprising two ferromagnetic anisotropic layers separated by a grain growth suppression layer, at least one of the ferromagnetic anisotropic layers has a first magnetic orientation direction;
a second magnetic shield element; and
a magneto-resistive sensor stack in electrical connection with the first magnetic shield element and the second magnetic shield element and separating the first magnetic shield element from the second magnetic shield element, the magneto-resistive reader is a tunneling magneto-resistive reader having a TMR ratio of 200% or greater, the tunneling magneto-resistive reader comprising a free magnetic element having a free magnetization orientation direction and a reference magnetic element having a reference magnetization orientation direction and an electrically insulating layer between the free and reference magnetic elements, where the first magnetic orientation direction is perpendicular to the free magnetization orientation direction or the reference magnetization orientation direction.

2. A magneto-resistive reader according to claim 1, wherein the grain growth suppression layer has a thickness of less than 100 Angstroms.

3. A magneto-resistive reader according to claim 1, wherein the grain growth suppression layer is non-magnetic.

4. A magneto-resistive reader according to claim 3, wherein the first magnetic shield element further comprises a hard magnetic layer.

5. A magneto-resistive reader according to claim 1, the grain growth suppression layer is magnetic.

6. A magneto-resistive reader according to claim 5, wherein the first magnetic shield element further comprises a hard magnetic layer.

7. A magneto-resistive reader according to claim 1, wherein the ferromagnetic anisotropic layers comprise NiFe and the grain growth suppression layer comprises Ru.

8. A magneto-resistive reader according to claim 1, wherein the ferromagnetic anisotropic layers comprise NiFe and the grain growth suppression layer comprises Ta.

9. A magneto-resistive reader according to claim 1, wherein the ferromagnetic anisotropic layers comprise NiFe and the grain growth suppression layer comprises Nb, Zr or Hf.

10. A magneto-resistive reader according to claim 1, wherein the two ferromagnetic anisotropic layers have about equal thicknesses.

11. A magneto-resistive reader according to claim 1, wherein the grain growth suppression layer inhibits diffusion, defect mobility, and grain crystallization during magnetic annealing of the magneto-resistive reader.

12. A magneto-resistive reader according to claim 1, wherein the first magnetic shield element further comprises a third ferromagnetic anisotropic layer, and a second grain growth suppression layer is located between the third ferromagnetic anisotropic layer and the second ferromagnetic anisotropic layer.

* * * * *